Figure 7:
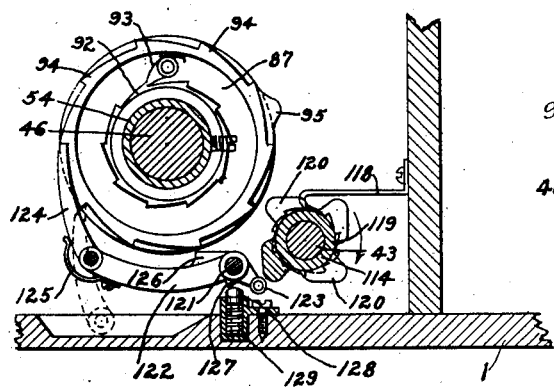

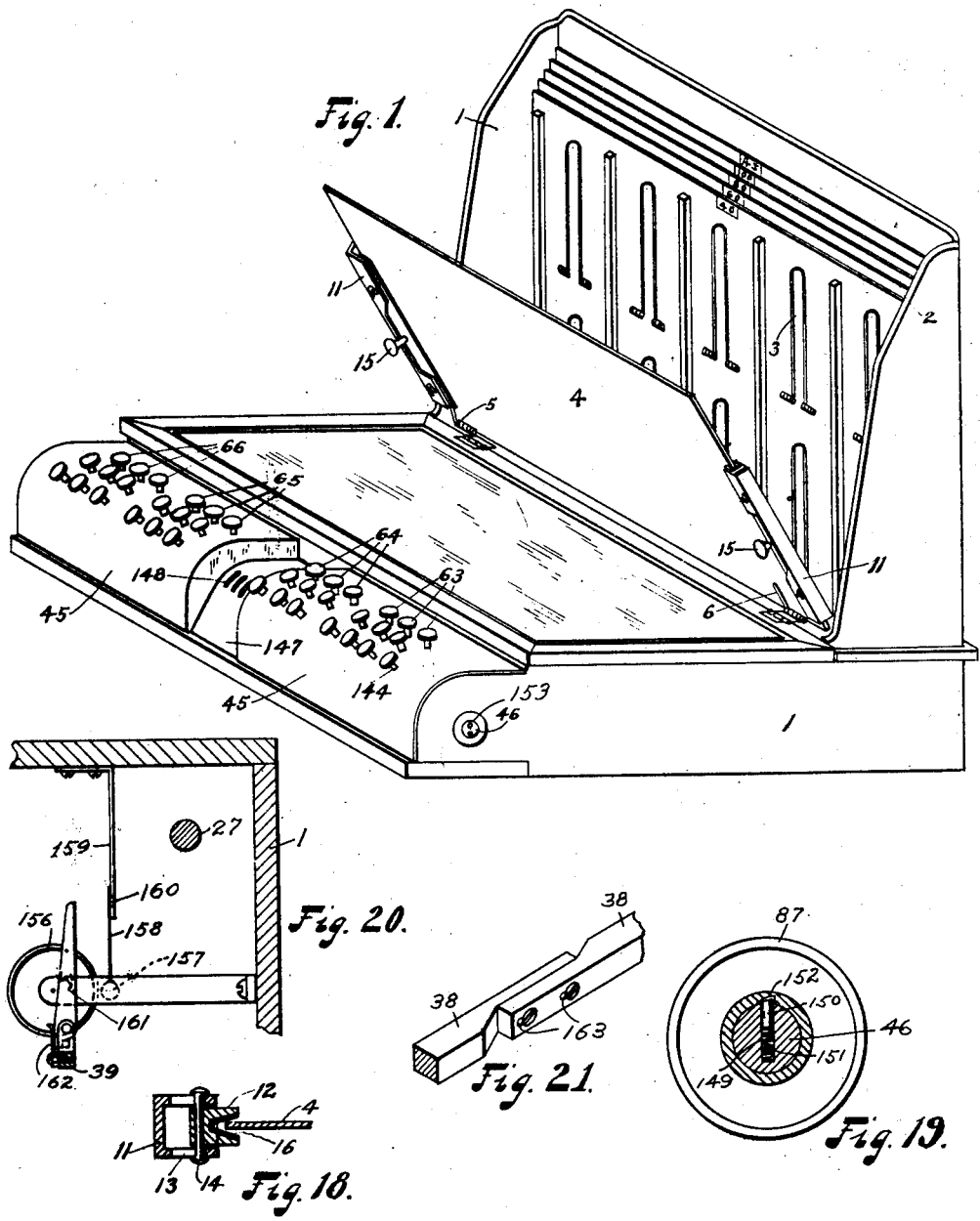

P. A. McCASKEY & S. E. FOUTS.
ACCOUNTING AND FILING APPARATUS
APPLICATION FILED JAN. 22, 1909.
1,092,158.
Patented Apr. 7, 1914
5 SHEETS—SHEET 2.
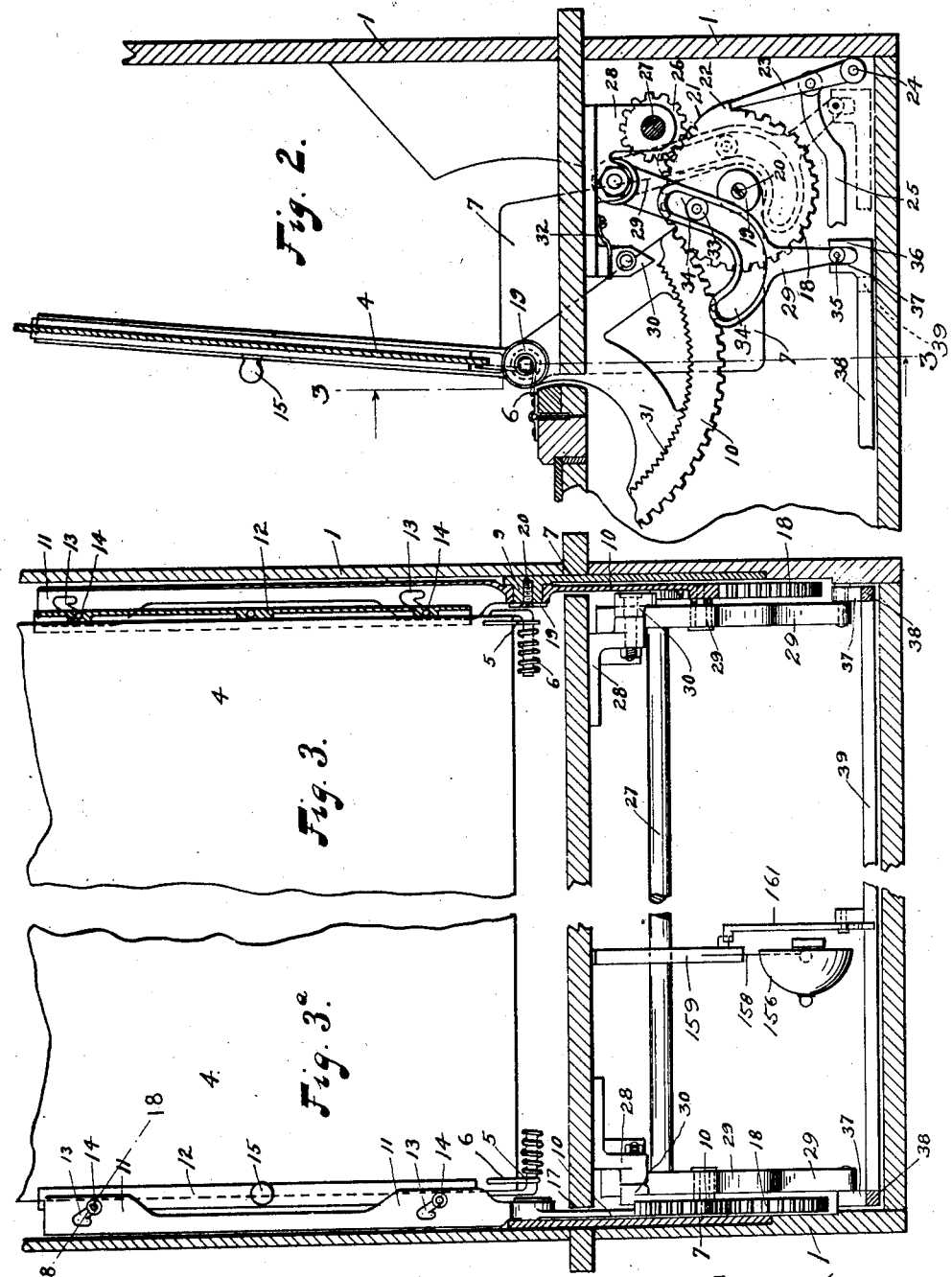

P. A. McCASKEY & S. E. FOUTS.
ACCOUNTING AND FILING APPARATUS.
APPLICATION FILED JAN. 22, 1909.
1,092,158.
Patented Apr. 7, 1914.
5 SHEETS—SHEET 3.
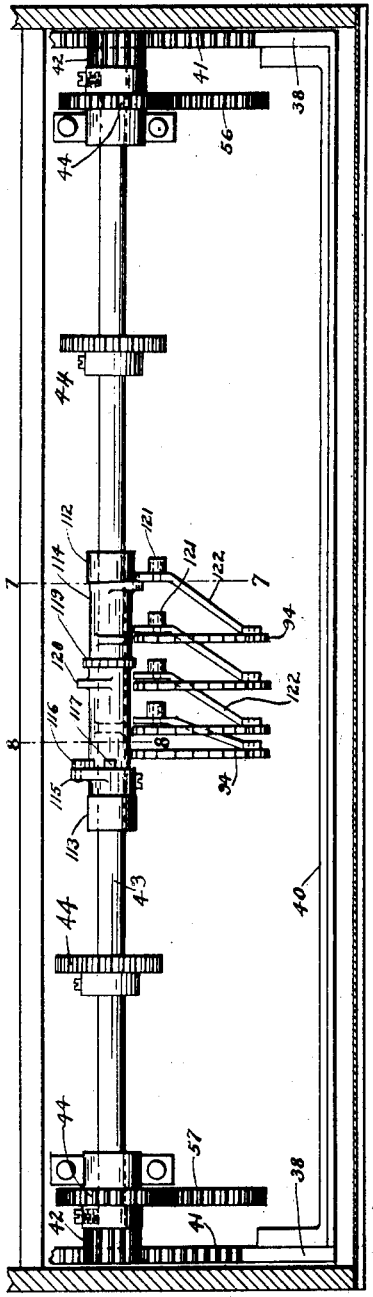
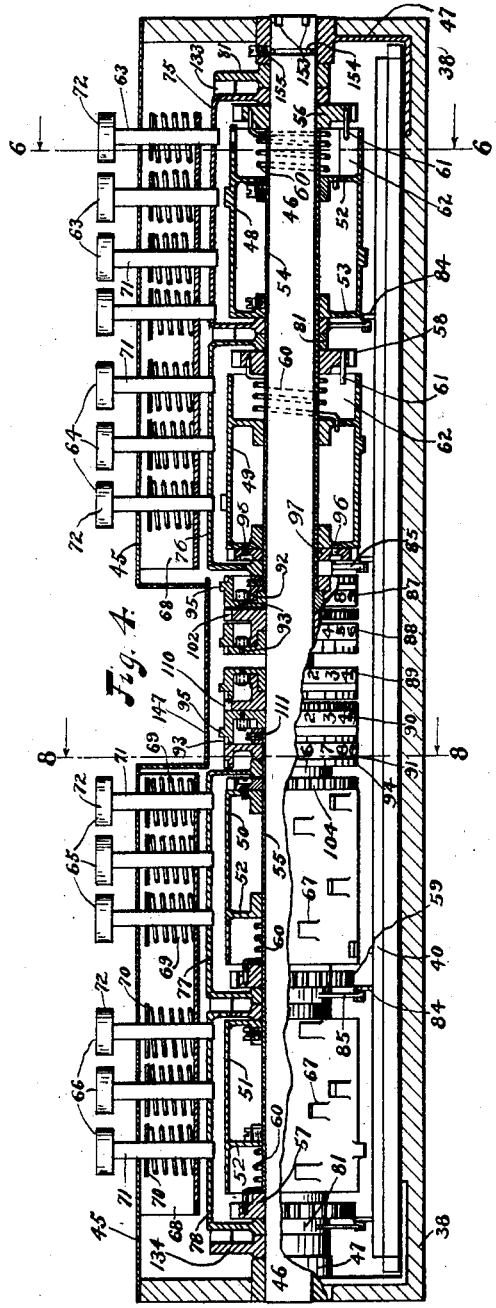
Witnesses:
Inventors
Perry A. McCaskey and
Samuel E. Fouts
By Baker, Fouts & Hull
attys.

P. A. McCASKEY & S. E. FOUTS.
ACCOUNTING AND FILING APPARATUS.
APPLICATION FILED JAN. 22, 1909.

1,092,158.

Patented Apr. 7, 1914.

5 SHEETS—SHEET 4.

Witnesses:
Edw Lindmueller
Nathan F. Fretter

Inventors
Perry A. McCaskey and
Samuel E. Fouts.
By Bakewell Cornwell & Hill
attys.

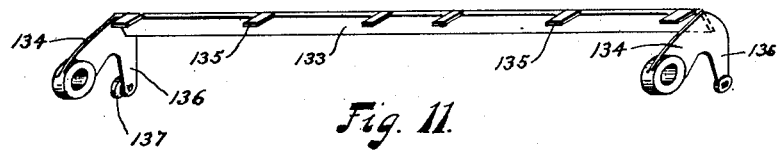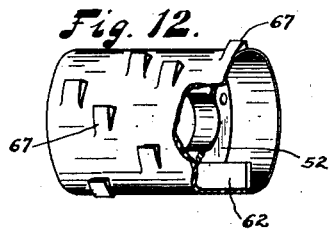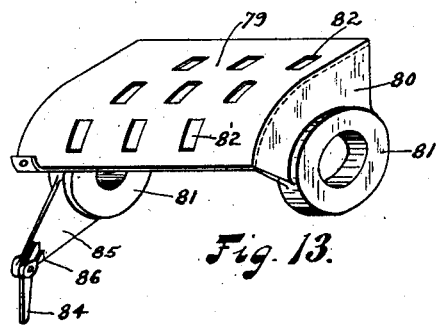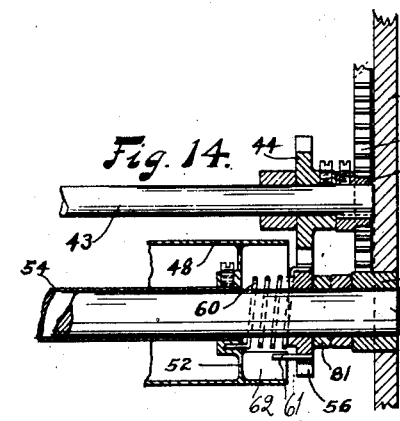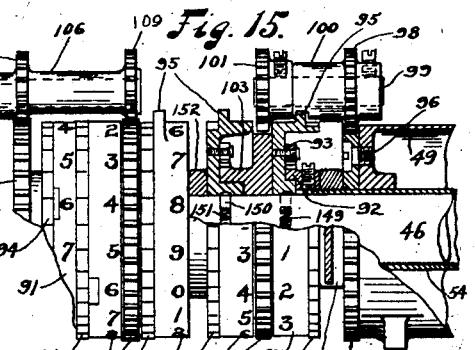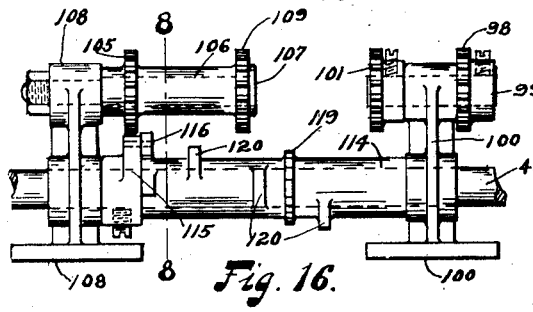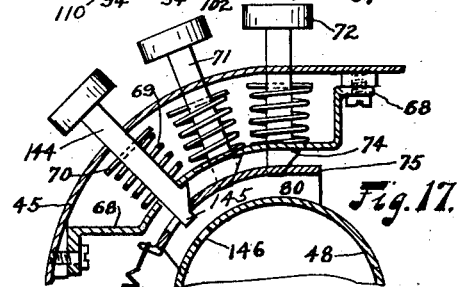

UNITED STATES PATENT OFFICE.

PERRY A. McCASKEY, OF ALLIANCE, AND SAMUEL E. FOUTS, OF EAST CLEVELAND, OHIO, ASSIGNORS TO THE McCASKEY REGISTER COMPANY, OF ALLIANCE, OHIO, A CORPORATION OF OHIO.

ACCOUNTING AND FILING APPARATUS.

1,092,158.  Specification of Letters Patent.  Patented Apr. 7, 1914.

Application filed January 22, 1909. Serial No. 473,733.

*To all whom it may concern:*

Be it known that we, PERRY A. MCCASKEY and SAMUEL E. FOUTS, citizens of the United States, residing at Alliance and East Cleveland, respectively, in the counties of Stark and Cuyahoga, respectively, and State of Ohio, have invented a certain new and useful Improvement in Accounting and Filing Apparatus, of which the following is a full, clear, and exact description, reference being had to the accompanying drawings.

This invention relates to combined adding or registering mechanism and filing appliances, and it has particular reference to an adding device that is adapted to be attached to a machine that is known as The McCaskey Account Register, one example of said machine being illustrated in the patent granted to P. A. McCaskey, No. 783,126, Feb. 21, 1905, to which patent reference is here made for a specific disclosure of said machine. In general, however, it may be stated that said machine is intended to take care of accounts in business houses, and consists of a series of leaves pivoted at their lower edges, said leaves having a series of clips behind which the accounts of customers are kept, each customer having a clip appropriated to his use. As is shown in said patent, the front leaf of the series serves as a cover for the remaining leaves. In our invention, we utilize this cover plate or leaf as a lever to which power is applied for operating the adding attachment or mechanism. In the machine as now constructed, there are no means for adding the amounts of the credit accounts, and the proprietor can determine the total amount of such accounts only by the laborious process of taking the various slips or checks held by the numerous clips and adding them with pencil and paper. This, of course, requires considerable time and trouble, and is attended with the usual number of mistakes incident to such a process. Our machine is intended to keep a continuous registration of all these accounts, and the proprietor can determine at any time the amount thereof by a simple reference to his adding wheels.

Our invention also provides means for locking the cover plate until a key in the "cents" bank of keys, or until the "No sale" key has been depressed; means for locking all keys after the cover plate has been moved from its normal position; means for holding the adding mechanism of any order of keys from operation unless a key in that order has been depressed; means for holding the "cents" adding mechanism from operation when the "No sale" key has been depressed; means for detachably connecting the cover plate with the other parts of the adding mechanism, so that the leaves with the cover plate may be removed from the machine and placed in a safe or vault for safe keeping, as is described in the said McCaskey patent.

Other features of our invention will be set forth in the following specification which is descriptive of the accompanying drawings in which—

Figure 8:
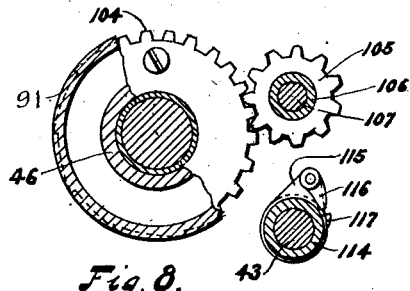
Figure 6:
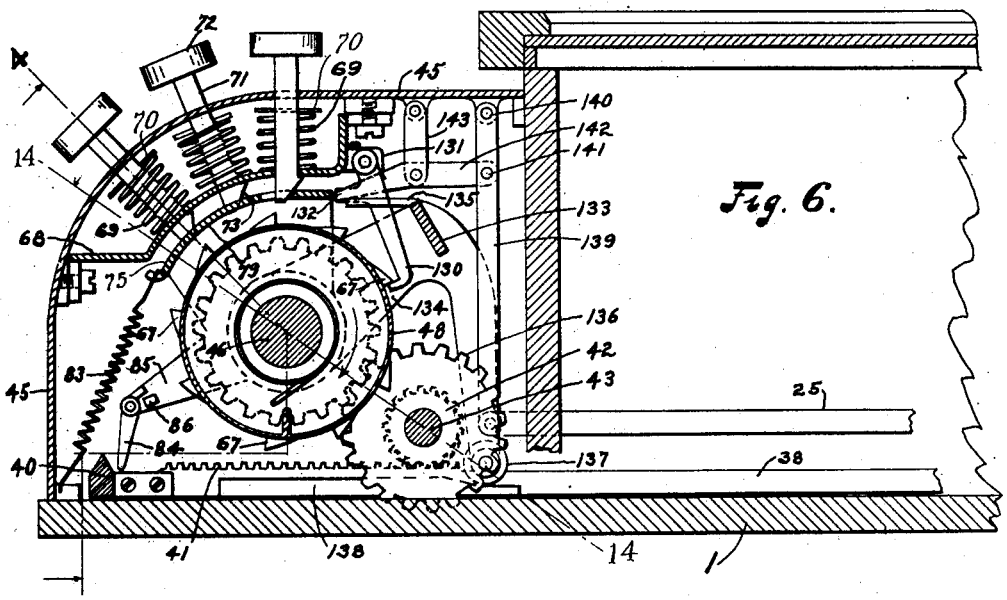
Figure 10:
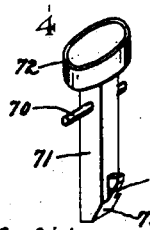
Figure 9:
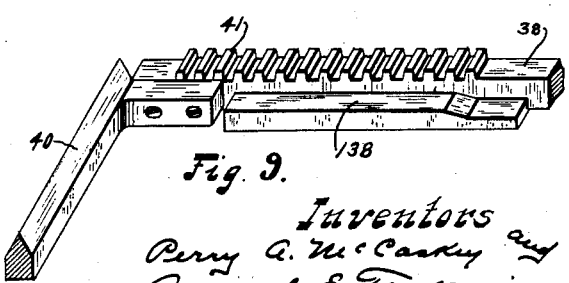

Figure 1 is a perspective view showing a McCaskey register with our invention applied thereto; Fig. 2 is a sectional view taken substantially through the center of the machine and showing the rear parts thereof with the connections between the cover plate and the rack frame for moving the registering mechanism; Fig. 3 is a view in section substantially on the line 3—3 of Fig. 2, looking to the rear, and showing the right-hand side of the machine, the operating segment being in section; Fig. 3$^a$ is a view similar to Fig. 3, showing in elevation the mechanism at the left-hand side of the machine; Fig. 4 is a view, partly in elevation and partly in section through the adding mechanism on line 4—4 of Fig. 6; Fig. 5 is a plan view of the transfer devices of the adding mechanism and the parts for operating the same; Fig. 6 is a section through the adding mechanism taken substantially on the line 6—6 of Fig. 4; Fig. 7 is a section through the registering and transfer mechanisms, taken substantially on the line 7—7 of Fig. 5; Fig. 8 is a view similar to Fig. 7, omitting the transfer levers, the same being taken substantially on line 8—8 of Figs. 5 and 16; Fig. 9 shows, in perspective, a portion of the rack frame with one of the cams attached thereto for operating the mechanism for locking the keys; Fig. 10 is a perspective view of a value key; Fig. 11 is a perspective view of the plate for locking the keys after the cover plate has been moved from normal position; Fig. 12 is a perspective view of one of the drums that coöperate with the keys for determining the extent of movement of the adding wheels; Fig. 13 is a perspective view of one of the detent plates for holding the keys in their depressed positions; Fig. 14 is a sectional view, from above, of parts shown in Fig. 6, the view being taken substantially on line 14—14 of Fig. 6; Fig. 15 is an enlarged plan view, partly in section and partly in elevation, of the adding wheels and their driving mechanism; Fig. 16 is a front elevation of the cam sleeve for operating the transfer levers, the pinions for turning certain of the adding wheels from their key drums, and the brackets for supporting the cam sleeve and pinions; Fig. 17 is a sectional view through the key board on a plane through the "No sale" key, showing the manner in which said key prevents the rotation of the key drum; Fig. 18 is a sectional view on line 18—18 of Fig. 3ª; Fig. 19 is a transverse section through the adding wheel shaft, showing one of the pawls for turning the wheels to zero; Fig. 20 is a detail view showing the bell ringing mechanism; and Fig. 21 is a detail view showing the means for adjusting the length of the side arms of the rack frame.

For further description, reference will now be made to the drawings, in which similar reference characters designate corresponding parts throughout the several views, and in which 1 represents the casing, preferably of the type used in the ordinary McCaskey register or filing appliance, in the upper part of which is contained the leaves 2, for carrying the account slips. These slips are held on the leaves by suitable spring clips 3, one example thereof being clearly set forth in the McCaskey patent above referred to. 4 is the cover plate for said leaves 2. The cover plate is pivoted at its lower edge as shown at 5, and is preferably pressed toward its closed position by the springs 6, that are coiled in line with the pivot of the plate and bear with one end against the plate and with the other against a stationary part of the frame. As has been stated, and as is described in the patent referred to, all the leaves with the cover plate are preferably detachably mounted in the frame of the machine, and may be disconnected therefrom and placed in a vault for safe keeping.

Secured to the interior of the casing at each end, and preferably set within a rabbeted portion of said casing, are plates 7. Said plates may be of the contour shown in Fig. 2. Projecting inwardly from these plates, coaxially with the pivots of the cover plate 4, are cylindrical lugs 9, said lugs forming a bearing for toothed operating segments 10. These operating segments are adapted to be detachably connected to the side edges of the cover plate, so that, when said plate is moved in opening or closing, the segments will be swung upon the lugs 9.

In order to attach the cover plate to the segments, the latter are extended upwardly in the form of an arm 11, said arm being, in section, shaped like a channel iron. (See Fig. 18.) That is to say, it has a central portion perpendicular to the plane of the cover plate, and a flange on each edge, said flanges being parallel to the cover plate. Mounted to slide longitudinally within the channels of these arms are clamping plates 12, said clamping plates being also shaped like channel irons, the plates being adapted to receive the edges of the cover plate within the said channels. Preferably, the channels are V-shaped, in order that they may secure a firmer hold upon the cover plate. The flanges of the arms 11 are provided near their upper and lower ends with L-shaped cam slots 13, said slots having their shorter ends extending in a substantially vertical direction and their longer ends inclined downwardly and inwardly. The clamping plates are provided with pins 14, that project into the cam slots 13, by means of which the said plates are supported and guided. The clamping plates are also provided with lifting knobs or buttons 15, upon which the operator can lift so as to engage or disengage the clamping plates from the edges of the cover plate. Preferably, the jaws of the clamping plates are lined with rubber or other non-abrasive material 16, so that they will not mar the cover plate.

From this description it will be understood that when the parts are in engaging position, as shown in Figs. 3 and 3ª, they may be disengaged by simply lifting on the knobs 15 of the clamping plates, which plates will thereupon be lifted and cammed backwardly by the slots 13 until the cover plate is disengaged. By releasing the knobs the clamping plates will then drop with their pins 14 resting in the short arms of the cam slots; and, while so positioned, the plates 12 will be maintained out of operative relation with the cover plate, and the latter with all the leaves may be taken from the machine. When these parts are to be again placed in the machine, the cover plate is clamped to the operating segment arm by simply lifting the clamping plates until their pins can enter the longer arms of the cam slots, when, by forcing the plates downwardly, they will securely grip the edges of the cover plate. By extending the clamping plates for a considerable distance along the edges of the cover plate, the latter is strengthened and danger of buckling is obviated.

Those parts of the operating segments 10 that are below the pivots project through slots 17 in the upper part of the casing, and on their lower faces they carry teeth that mesh with gears 18, said gears being journaled on bosses or lugs on the plates 7. The segments and gears are held in position on the lugs of this plate by means of washers 19, said washers being secured to the lugs by screws 20 which pass through the washers and into the lugs.

The parts on the two sides of the machine are identical, except that one set is right hand, the other, left hand, and a description of one set will suffice for both.

The gear 18 is provided with teeth extending about its periphery, except at 21, where it is blank. There are sufficient teeth, however, to permit a full swing of the segment and cover plate. At 22 the disk is provided with a catch or lug, with which engages a locking lever 23, said lever being secured to a rock shaft 24 that is mounted in the rear of the casing. To one of the locking levers there is pivotally secured the rear end of a bar 25, the forward end of which is connected to mechanism under control of the keys in the cents bank and the "No sale" key, as will be hereinafter described, so that, when one of these keys is depressed, the locking levers will be simultaneously rocked to unlock the cover plate. In order to secure perfect parallelism of movement of the parts at the two sides of the casing, pinions 26 are caused to mesh with the teeth on the gears 18, said pinions being secured to their shaft 27, which causes them to turn together.

The shaft 27 is journaled in brackets 28 that depend from the upper part of the casing adjacent the slots 17. Said brackets also form means for supporting the operating levers 29 and the full-stroke pawls 30. These pawls are substantially triangular in shape, the apex of the triangle pointing downwardly and being adapted to engage with ratchet teeth 31 on the operating segments. Springs 32 bear upon the upper flat portions of the pawls and hold the same normally in the position shown in Fig. 2, in which position it is beyond the rear end of the row of ratchet teeth. When the cover plate is turned down, the ratchet teeth push the lower end of the pawl into an inclined position; and while in such position the pawl will resist any backward movement of the segment by engaging the teeth of the ratchet, until the pawl has passed over the forward end of the row of ratchet teeth, when the pawl will again take a vertical position. Upon the return of the cover plate the pawl is again inclined, and will effectually resist any reversal of movement of the cover plate until the same has been closed. By this means, the cover plate is compelled to swing through an angle that is sufficient to cause the parts of the register to operate properly.

The gear wheels 18 are each provided on one of their sides with an anti-friction roller 33, which travels in a cam slot 34 in the corresponding operating lever 29. Below the cam slots, these levers extend downwardly and carry at their lower ends anti-friction rollers 35 that work between fingers 36 and 37 on the rear end of a rack frame, hereinafter described.

With the parts in the position shown in Fig. 2, the roller 33 is near the upper end of the cam slot 34, and is slightly to one side of the line drawn vertically through the center of the gear wheel. As the cover plate is opened, the roller pushes the lever rearwardly, carrying the rack frame with it. When the roller reaches the position shown in broken lines, the rack frame has moved its full extent. Consequently, the cam slot is made in such a shape that, with the lever in this position, said slot will be concentric with the journal of the wheel. Any further movement of the wheel, therefore, will have no effect on the rack frame. It will thus be seen that the rack frame is moved rearwardly during the first part of the opening movement of the cover plate, and is not returned until the last part of the closing movement of said plate. The purpose of this mode of operation will be made to appear hereinafter.

The rack frame is of open rectangular form, consisting of the side bars 38, the rear cross bar 39 and the front cross bar 40. The fingers 36 and 37 project upwardly from the rear ends of the side bars 38. As the side bars 38 are moved simultaneously by the operating levers 29 and are braced together by the cross bars, all danger of binding or twisting is avoided.

Near their front ends, the side bars are each provided with rack teeth 41, which teeth mesh with pinions 42 on a transverse shaft 43, said pinion being keyed or otherwise secured to said shaft. As the rack frame is moved back and forth, the shaft 43 will be turned, first in one direction and then in the other. The size of the pinions 42 is such that the shaft will be turned a trifle more than a complete rotation with each complete stroke of the rack frame. Also keyed, or otherwise secured, to said shaft are gears 44, there being one of said gears for each order of keys in the key bank.

The registering mechanism proper is contained within a casing 45 that is attached in any suitable manner to the front of the main casing 1. Passing through the register casing near its center, is a main supporting shaft 46, said shaft being supported at its ends in brackets 47 that are secured within the register casing. Supported loosely upon this shaft, are a series of key drums, one for each order of keys in the key bank, the cents drum being designated 48, the dimes drum, 49, the dollars drum 50, and the tens of dollars drum 51. One of these drums is shown in perspective in Fig. 12, with parts broken away to show the interior construction, and from this view, taken in connection with Fig. 4, it will be seen that the drums consist of a shell with a pair of inwardly projecting journal flanges, 52 and 53, the flange 53 being at one end of the drum and the flange 52 being removed some distance from the opposite end thereof, for a purpose hereinafter set forth. The journal flanges for the drums do not bear directly upon the shaft 46, but, in the case of the drums 48 and 51, they are secured to sleeves 54 and 55 respectively, while the drums 49 and 50 turn loosely upon said respective sleeves.

Carried loosely upon the shaft 46 are gears 56 and 57; and similar gears 58 and 59 turn loosely upon the sleeves 54 and 55. Each of these gears mesh and turn with the gears 44 on the shaft 43, so that they oscillate back and forth with the movements of the rack frame. The gears 56 to 59 are each placed at that end of the corresponding key drum that has the journal flange 52; and they are connected yieldingly with said flanges by coiled springs 60, said springs being attached at one of their ends to a gear and at their other ends to a flange 52, the flange being set inwardly from the end of the drum to accommodate the spring. Each of the gears 56 to 59 is provided on its side next its corresponding drum with a pin or projection 61, that is adapted to engage with an inwardly extending plate or projection 62 on the drum, the tension of the spring normally holding these projections in engagement, the drums tending to follow the wheels in their oscillatory movements.

Opposite each of the drums 48 to 51, and projecting through the casing 45 in a direction substantially radial with respect to the shaft 46, are a series of value keys, the cents keys being shown at 63, the dimes keys at 64, the dollars keys at 65 and the tens of dollars keys at 66. Each of the said drums is also provided with a series of projections 67 on its outer surface, said projections being adapted to be intercepted by the ends of the keys when in depressed position, each lug having its own appropriate key and the keys and projections being so arranged that the No. 9 key in each bank will permit the drum in said bank to move nine times as far as it will when the No. 1 key in that bank is depressed. Normally, the keys are projected radially so as to lie outside the orbits of said projections; but when the keys are depressed to their full extent they will project within said orbits and will intercept said projections and thereby arrest the rotation of the drums. As shown, each of the different orders has nine keys except the cents order, which is provided with a zero key in addition, for a purpose hereinafter set forth.

The keys are preferably guided in their movements by the casing 45 and by interior plates 68 attached to said casing, said plates being spaced from the casing so as to more effectually guide the keys and to provide a space for the coiled springs 69, which surround the key stems and bear with one of their ends against the plates 68 and with their other ends against pins 70 that are passed through the key stems. These pins serve as abutments for the spring, which normally hold the keys outwardly.

From Fig. 10 it will be seen that the keys are each provided with squared stems 71, and rounded heads or captions 72, upon which head the appropriate figure designating the value of the key can be placed. The lower ends of the keys are beveled in one direction at 73, said bevel being continuous with the bevel on the lower edge of lugs 74 that project from the keys near their lower ends. These lugs normally rest against the inner face of the plate 68, and thereby serve to prevent the keys from being forced too far outwardly by their springs 69. They also serve to hold the keys in their depressed positions by engaging with detent plates, now to be described.

As the keys do not actuate the registering mechanism, but merely determine the extent of operation thereof when the cover plate is moved, it is obvious that some means must be provided for holding the keys in their depressed positions while the cover plate is moving. These means consist, primarily, of a series of detent plates, one of said plates being shown in perspective in Fig. 13. The detent plate for the cents keys is designated 75; that for the dimes keys, 76; that for the dollars keys, 77 and that for the tens of dollars keys, 78. These detents consist of a central plate 79, said plate being turned at right angles at its ends to form a yoke. The ends 80 of said yokes are provided with journaled bosses 81, through which openings are formed so that the detent plates can be mounted on the shaft 46, or the sleeves 54 and 55 thereon. As will be seen from Fig. 4, these detent plates or yokes straddle their respective key drums, and the central plates 79 are curved so as to be concentric throughout the greater part of their widths with the shaft 46. The detent plates are each provided with perforations 82 preferably of rectangular shape into or through which the keys project. Normally, the inner ends of the keys simply extend into these perforations without projecting therethrough to any substantial distance, and the detent plates are held against the keys by springs 83, which are connected at one of their ends to said plates and at their other ends to a suitable and stationary part of the casing.

The perforations are elongated, as shown in Fig. 13, so as to permit the detent plates to swing about the shaft 46; and, when the keys are depressed, the beveled portions of the keys and the lugs 74 thereon cam the the plates rearwardly against the tension of the springs 83, the elongated perforations permitting this movement. As soon as the lug 74 has passed beyond its detent plate, the latter is swung forwardly by its spring 83 and engages above the lug, which holds the key depressed with its inner end in the path of the corresponding projection 67.

At substantially the end of the operation of the machine, the keys must be released. This result is accomplished by the rack frame cross bar 40, which engages with depending by-pass pawls 84 that are pivoted on the forward ends of arms 85 that project from one of the journal bosses 81 of the detent plates. Referring to Fig. 6, it will be seen that as the cross bar 40 moves rearwardly with the opening movement of the cover plate, the pawls 84 simply rock on their pivots without moving the detent plates; but, on the return movement of said cross bar, the pawls will act as rigid parts of the arms 85, due to the engagement of the upper ends of the pawls with stationary lugs 86 on said arms, and the detent plates will be lifted to release the keys, which then spring outwardly. Before coming to rest, the cross bar passes the ends of the pawls 84, and the detent plates are then brought back to their normal positions by their springs 83.

While the machine shown is adapted to register amounts at a single operation varying from one cent up to $99.99, it is obvious that the capacity of the key board may be enlarged by simply adding other orders of keys to the left hand end thereof, or it may be diminished as desired.

We will now proceed to describe the registering mechanism proper. This consists of a series of adding wheels, the cents wheel being shown at 87, the dimes wheel at 88, the dollars wheel at 89, the tens of dollars wheel at 90 and the hundreds of dollars wheel at 91. These wheels are all mounted on the central shaft 46, except the wheel 91, which is loosely mounted on the sleeve 55. The wheel 87, which is shown in enlarged side elevation in Fig. 7, is operated from the cents drum 48, through the medium of the sleeve 54, said wheel being at the end of said sleeve. Pinned, or otherwise secured to the end of said sleeve next the wheel 87, is a ratchet wheel 92, having teeth on its outer periphery with which is adapted to engage a pawl 93 that is carried on the side of the wheel 87. As the sleeve 54 is connected to the cents key drum and the ratchet wheel 92 is connected to the sleeve, these parts must move together, the ratchet wheel oscillating back and forth with the drum. When moving to the right, in Fig. 7, the pawl will engage the teeth of the ratchet wheel and cause the adding wheel 87 to turn therewith; but when the ratchet wheel moves in the opposite direction, the pawl will trip over the teeth without moving the adding wheel, said wheel being held against backward movement by a suitable detent pawl, not shown, that engages with ratchet teeth 94 on the outer periphery of said wheel.

The outer rim of the adding wheel overhangs the ratchet wheel and pawl so as to provide a surface sufficient for carrying the numerals 0 to 9, the ratchet teeth 94 and a transfer lug 95, which will be more specifically described hereinafter. The dimes adding wheel 88 derives its motion from the dimes key drum 49; and to provide for such movement, we attach to the end of said key drum, as by screws 96, a gear wheel 97, said gear wheel meshing with a pinion 98 secured to one end of a short shaft 99, that is journaled in a bracket 100, suitably supported from the base of the casing. On the opposite end of the shaft is similarly secured a pinion 101, which meshes with a combination gear and ratchet wheel 102 on the main shaft 46 alongside the tens adding wheel 88. The ratchet of this wheel is carried on an annular flange 103 that projects toward its adding wheel so as to be engaged by a pawl on said wheel like the pawl 93 on the cents wheel. The pinions 98 and 101 are of the same size, as are also the gears 97 and 102, so that the adding wheel 88 is turned precisely the same angular distance as is the key drum 49. This adding wheel, as well as all of the remaining adding wheels except the last, is also provided with a ratchet ring 94, a series of numerals and a transfer lug 95. The last wheel, 91, has no transfer lug.

The dollars adding wheel, 89, derives its motion from the dollars key drum, 50, by means similar to that just described. The said drum has secured to its end a gear 104 that meshes with a pinion 105 on one end of a sleeve 106 that is journaled on a stud bolt 107, said bolt being supported from a bracket 108, suitably supported from the base of the casing. On the opposite end of this sleeve is a pinion 109 that meshes with another combination gear and ratchet wheel 110, similar to the wheel 102 except that its ratchet flange is turned in the opposite direction. The dollars adding wheel is turned from this combination wheel in the same manner as has been heretofore described, so that a further description is not deemed necessary.

The tens of dollars adding wheel is moved from the tens of dollars key drum through the medium of the sleeve 55, to which said drum is secured, a ratchet wheel 111 secured to the inner end of said sleeve, and a pawl 93 secured to the side of the adding wheel and engaging the ratchet wheel, in the same manner as has been described in connection with the cents adding wheel.

The hundreds of dollars adding wheel has no corresponding key drum shown, but it derives its movement solely through the transferring mechanism.

Carried upon the shaft 43, at the rear of and below the adding wheels and between brackets 112 and 113, are a transfer cam-sleeve 114 and a pawl carrying arm 115. The cam-sleeve is loose upon the shaft, while the arm 115 is secured to the shaft and swings back and forth as the shaft oscillates. This arm carries a pawl 116, Fig. 8, that is adapted to engage with a lug 117 near the adjacent end of the cam-sleeve. A suitable spring will be employed for holding the pawl into engagement with the sleeve, so that it will strike the lug 117 and turn the sleeve with it in one direction, but will trip over the lug and leave the sleeve stationary as the pawl moves backwardly. As will hereinafter appear, it is necessary for the cam-sleeve to be given one complete rotation at each operation of the machine; and it has already been stated that the shaft 43 is given a trifle more than a complete rotation with each full stroke of the rack frame. This excess of movement over the complete rotation is for the purpose of assuring the proper engagement of the pawl 116 with the lug 117. The cam-sleeve is prevented from moving backwardly with the pawl by a catch 118 that is stationarily mounted in the casing, said catch engaging with a ratchet wheel 119 on the cam-sleeve.

Arranged spirally about the cam-sleeve 114 are a series of cam projections 120, there being one of these projections for each adding wheel except the one of highest denomination. Mounted on suitable supports 121, arising from the casing in front of the cam-sleeve, are transfer levers 122, said levers being pivoted near their rear ends and provided on said ends with anti-friction rollers 123. These rollers are adapted to be engaged by the cams 120 as the sleeve 114 is turned. On their opposite ends these levers carry pawls 124 for engaging with the ratchet teeth 94 of the adding wheels, said pawls being pressed into engagement with said teeth by springs 125. On their sides next the adding wheels and just in front of their pivots, these levers are provided with cam-lugs 126, said lugs lying in the same planes as the lugs 95 on the adding wheels. Fig. 5 shows the transfer levers 122 and also the ratchet teeth 94 on the adding wheels, and from this figure, it will be seen that each of the levers is bent laterally, so that, while its cam lug 126 lies in the plane of the orbit of a lug 95 of one adding wheel, its pawl 124 is in position to engage with the ratchet teeth of the adding wheel of the next higher denomination. From this description it will be understood that, as the lug 95 on one adding wheel passes the cam-lug 126 appropriate thereto, the lever 122 having said lug will be depressed to carry its pawl 124 downwardly far enough to cause it to move over one tooth of the ratchet wheel of the next higher order and take a position for engaging with said tooth. Thereafter, when the cam-sleeve is rotated, the cam 120 thereon will force the rear end of the transfer lever downwardly and throw up the forward end of said lever, which will cause the pawl to turn the next adding wheel the distance of one tooth, thereby adding one on said wheel. There is a transfer lever and a transfer lug 95 for each adding wheel, except the one of highest denomination; but, as these levers are alike in construction and operation, it is not deemed necessary to describe them further, except to state that, owing to the spiral arrangement of the cams 120 on the cam-sleeve, the levers will be operated successively.

In order to hold the transfer levers in either their upper or lower positions, they are provided with lugs 127 below their pivots, with which engage plunger bolts 128, said bolts being pressed toward the lugs by springs 129. The upper end of each bolt is rounded, as shown, so as to engage with either face of the adjacent lug, and thereby hold the levers 122 yieldingly in either of their two positions.

From the description heretofore given of the operating mechanism for the key drums, it will be understood that, as the cover plate moves forwardly in opening, the rack frame will move rearwardly. This, through the connecting train of gearing, will cause the gear wheels 56, 57, 58 and 59 to turn simultaneously in a direction to carry their pins 61 away from the plates 62 on their respective drums. The tension on the springs 60 is sufficient, however, to cause the drums to follow the gears, and the pins and plates are maintained in contact until the drums are arrested by the keys that have been depressed, when the pins and plates separate, the springs being then put under stronger tension. The gears 44 and 56 to 59 are so proportioned that the trifle more than one rotation of the former will turn the latter gears only about nine tenths of a revolution, since the drums should never rotate farther than is necessary to add 9 on the adding wheel corresponding thereto. When the cover plate is closed, the gears 56 to 59 are rotated in a reverse direction to their initial movement; and, during such reverse movement, the drums are picked up and also returned to normal position. The teeth on the ratchets 92 and the pawls 93 on the adding wheels are so arranged that the said wheels are turned to add the value of the depressed keys during the opening movement of the cover plate; and the pawl 116 is arranged to turn the cam-sleeve 114 to effect the transfers during the closing movement of the cover plate. In fact, the rack frame is moved to permit the adding wheels to turn to add during the first part of the opening movement of the cover plate, while the cam-sleeve is not turned until the last part of the closing movement of said plate. By this construction, ample time is afforded for the key drums to turn to the positions determined by the depressed keys before they are picked up again by the pins 61.

By a simple reversal of the ratchets and pawls for turning the adding wheels, and of the pawl for turning the cam-sleeve 114, the machine may be caused to add during the closing movement of the cover plate, and to transfer during the next opening movement thereof. This manner of operation causes the adding wheels to be turned positively, but it has the disadvantage of postponing the transfer until the next operation of the machine.

Means must be provided for preventing the key drums from turning except when a key in the order corresponding thereto has been depressed. Otherwise the drums would cause their adding wheels to register 9 with each operation of the machine. This means consists of a series of hooks or pawls 130, Fig. 6, which are normally engaged with one of the projections 67, or with a separate lug on the drums, said hooks being pressed by springs 131 into engaging position. There is one of these plates for each key drum, or for each detent plate, and they are controlled by said detent plates. For this purpose, each hook is provided with a forwardly projecting lug 132 just at the rear edge of the corresponding detent plate; and when said plate is moved rearwardly by the depression of a key in the order corresponding thereto, the hook will be disengaged from its lug 67 so that the drum may turn as the cover plate is opened. It will be understood that when no key is depressed in an order of keys, the corresponding detent plate will not be moved, and consequently, the key drum of that order will remain locked.

After any key in the key board has been depressed and held by its detent, it can be released at any time before the cover plate is moved by simply depressing another key in the same order, the second key moving the detent plate far enough to free the first. After the cover plate has been moved, however, all the keys should be locked against movement. For this purpose we provide a yoke shown in perspective in Fig. 11, which is adapted to be moved rearwardly into engagement with the detent plate so that they can not be moved. This yoke consists of a cross bar 133 and depending arms 134 that are journaled on the central shaft 46 outside of all the detent plates. The cross bar 133 is provided with a series of fingers 135 that project forwardly at the rear of the detent plates. By swinging this yoke forwardly, the fingers will engage with the detent plates and prevent the movement thereof, which will prevent the depression of any other keys, and will hold the depressed keys in locked position. The yoke is thus swung by means of arms 136, depending from the yoke and carrying on their lower ends anti-friction rollers 137, said rollers bearing upon cam plates 138 on the inner sides of the side bars 38 of the rack frame. Fig. 6 shows these parts in normal position; and, from this figure, it will be seen that, as soon as the rack frame is moved rearwardly, the yoke will be cammed forwardly and held in this position until the cover plate and the rack frame have substantially resumed their normal positions. It is also desirable to prevent the movement of the cover plate unless a key bank has been depressed. For this purpose the locking lever 23, heretofore described, is employed. The bar 25 connected to said lever extends forwardly, as shown in Fig. 6, and enters the casing for the registering mechanism where it is pivoted to the lower end of a swinging arm 139 that is pivoted to the upper part of the casing 45 at 140. This bar has connected to it, at a point 141, a horizontal link 142 that projects forwardly to a point just at the rear of one of the detent plates, the said link being held in proper relation with the detent plate by a link 143, also pivoted to the upper part of the casing 45 and to the link 142 in front of the point 141. When a key belonging to that detent plate is depressed, said plate will force the link 142, the arm 139 and the locking levers 23 rearwardly, thereby carrying the latter out of engaging position with respect to the catches or lugs 22 on the gears 18. The cover plate can then be opened.

While the machine may thus be unlocked from any key in the key bank, we prefer to operate the unlocking device entirely from the detent plate 75 of the cents order, it being obvious that most transactions will involve the depression of a key in that order and that the natural order of depressing the keys will be from the tens of dollars on down to cents. By simply changing the location of the link 142, or by duplicating the same, we may unlock the machine by depressing any key in the key board.

It is sometimes necessary to refer to the slips or checks on the leaves 2 when no transaction is to be registered, and for that reason we have provided a zero key, which we have placed in the cents order, as is shown at 144 on Fig. 1, and have particularly illustrated in Fig. 17. This key differs from the regular value keys only in respect to its location in the key board and the shape of its inner end, said end being extended at 145 so as to enter a perforation 146 in the cents key drum 48 when the key is depressed. This key coöperates in the usual manner with the cents detent plate 75, and thereby trips the hook 130 corresponding to said cents key drum. This would permit the drum to rotate with the opening movement of the cover plate if it did not otherwise hold the drum, which it does by entering the perforation 146 therein.

As appears from Fig. 1, the casing 45 for the registering mechanism is made in two parts, separated by a section 147 of the casing which covers the adding wheels. This section is lower than the adjoining parts of the casing, which enables the register wheels to be more easily inspected, the said section being provided with openings 148 opposite the adding wheels and through which the amounts indicated by said wheels may be read.

It is desirable at the beginning of a day's business to start in with a new registration; and, for this reason, we have provided means for turning the register wheels back to zero. As has been stated, the register wheels are journaled on the central shaft 46. Opposite the adding wheels the shaft is provided with sockets 149, in which are placed plungers 150, said plungers being pressed outwardly by springs 151 in the sockets below the plungers. These plungers are adapted to engage with a notch 152 in the interior of the hub of each adding wheel. By this means, a rotation of the shaft 46 in the proper direction will carry the adding wheels around with the shaft until they will indicate zero through the openings 148. In order that the shaft may be rotated, we extend the same through the casing at one end, where it is provided with holes 153 for the reception of a suitably shaped key, not shown, by means of which the shaft may be rotated. In order to hold the shaft from longitudinal movement we form the same with an annular groove 154 near one end, into which projects the end of a set screw 155 that is screwed into the bearing of the bracket 47.

We have also provided a device for sounding an alarm when the cover plate 4 is opened, said device being shown particularly in Figs. 3ᵃ and 20. This device comprises a bell 156 and a clapper or striker 157 that is secured to the lower end of a flexible wire or rod 158. This rod is secured to the lower end of a flexible plate 159 that is secured at its upper end to the casing. The plate has a laterally projecting lug 160 near its lower end that extends into the path of movement of a tripping finger 161 that projects upwardly from the cross bar 29 of the rack frame. This finger is pivoted to the cross bar in the manner of a knife-blade, so that it will turn in one direction against the tension of a spring 162, but will stand rigidly against pivotal movement in the opposite direction.

As the rack frame moves rearwardly upon the opening movement of the cover plate, the finger 161 swings the clapper, bending the plate 159; and, when the finger passes the lug 160, the plate springs forwardly, ringing the bell. When the rack frame moves forwardly, the finger rocks upon its pivot and passes the lug without bending the plate 159.

In order to provide an adjustment for the rack frame so as to cause the front bar 40 thereof to release the keys at the proper time, we divide the side bars 38, as shown in Fig. 21, and secure the members of the same by screws, which pass through slots 163 in one of the members. By loosening these screws, the length of the side bars may be varied, and such length maintained by again tightening the screws.

Numerous details in the construction of our invention may be changed without departing from the spirit thereof, and we desire it to be understood that we do not limit our claims to such details any further than is necessitated by the specific terms employed therein or by the prior state of the art.

Having thus described our invention, what we claim is:

1. In an apparatus of the character described, the combination with a total adding mechanism, of a series of pivoted leaves for holding account slips, and means for operating the adding mechanism from one of the said leaves.

2. In an apparatus of the character described, the combination with a total adder, of a series of pivoted leaves for holding account slips, and means for operating the total adder from the said leaves.

3. In an apparatus of the character described, the combination with a total adder, of a series of keys for controlling the action of said adder, a series of movable devices for holding account slips, and means for preventing the operation of said devices until a key of the said series is operated.

4. In an apparatus of the character described, the combination with a total adder, of a series of keys for controlling the action of said adder, a series of pivoted leaves for holding account slips, and means for preventing pivotal movement of said leaves until a key of the said series is operated.

5. In an apparatus of the character described, the combination with a total adder, of a bank of value keys containing an order of keys for cents, a series of devices for containing account slips, and means for preventing access to said account slips until after a key in the cents order of the key bank has been operated.

6. In an apparatus of the character described, the combination with a total adder, of a bank of value keys containing an order of keys for cents, a series of pivoted leaves for holding account slips, and means for preventing pivotal movement of said leaves until after a key in the cents order of the key bank has been operated.

7. In an apparatus of the character described, the combination with a total adder, of a series of keys for controlling the operations of said adder, a series of devices for containing account slips, and means for preventing the depression of any key while one of said devices is moved from its normal position.

8. In an apparatus of the character described, the combination with a total adder, of a series of keys for controlling the operations of said adder, a series of pivoted leaves for holding account slips, and means for preventing the depression of any key after one of said leaves has been moved from its normal position.

9. In an apparatus of the character described, the combination with a total adder, of a series of keys for controlling said adder, a series of pivoted leaves for holding account slips, means for preventing the pivotal movement of said leaves until after a key has been operated, and means for preventing the operation of any key after one of said leaves has been moved from its normal position.

10. In an apparatus of the character described, the combination with a total adder, of a series of keys for controlling said adder, a series of devices for containing account slips, means for preventing access to said devices until after a key has been depressed, and means for preventing the depression of any other key while one of said devices is moved from its normal position.

11. In an apparatus of the character described, the combination with a total adder, of a series of keys for controlling the operations of the adder, a series of pivoted leaves for holding account slips, means for preventing movement of said leaves until after a key has been operated, means for preventing the operation of any other key while any of said leaves is moved from its normal position, and mechanism connected with said leaves for operating the total adder.

12. In an apparatus of the character described, the combination with a casing, of a series of slip holding devices pivotally mounted at the rear of said casing and free to swing relatively to each other from a substantially vertical position to a substantially horizontal position, and vice versa, a total adding mechanism mounted on the front of said casing, and means connecting the said devices with the adding mechanism for operating the latter when one of said devices is moved.

13. In an apparatus of the character described, the combination with a casing, of a series of leaves for holding account slips pivoted at the rear of said casing and free to swing relatively to each other, a total adding mechanism mounted on the front of said casing, and means connecting the said leaves with the adding mechanism for operating the latter when the leaves are moved.

14. In an apparatus of the character described, the combination with a casing, of a series of slip holding devices mounted on said casing, of a total adding mechanism, a rack in said casing, connections between said rack and said devices for moving the rack when either of the devices is moved, and connections between said rack and the adding mechanism for operating the latter.

15. In an apparatus of the character described, the combination with a casing, of a series of leaves for holding account slips pivoted on said casing, of a total adding mechanism, a rack in said casing, connections between said rack and said leaves for moving the rack when the leaves are moved, and connections between said rack and the adding mechanism for operating the latter.

16. In an apparatus of the character described, the combination of a casing, a series of slip holding devices mounted in said casing, a rack in the casing connected with said devices, a total adding mechanism, a series of keys for controlling the operation of said adding mechanism, and means controlled by the keys for preventing the movement of the rack until after a key has been operated.

17. In an apparatus of the character described, the combination of a casing, a series of leaves for holding account slips pivoted in said casing, a rack in the casing connected with said leaves, a total adding mechanism, a series of keys for controlling the operation of said adding mechanism, and means controlled by the keys for preventing the movement of the rack until after a key has been operated.

18. In an apparatus of the character described, the combination with a casing, of a series of devices for holding account slips mounted in said casing, a rack in the casing connected with the said devices and operated thereby, a total adding mechanism, a series of keys for controlling the operation of said mechanism, means under control of the keys for preventing the movement of the rack until after a key is depressed, and means under control of the rack for preventing the subsequent operation of a key until after the rack has been returned to normal position.

19. In an apparatus of the character described, the combination with a casing, of a series of leaves for holding account slips pivoted to said casing, a rack in the casing connected with the said leaves and operated thereby, a total adding mechanism, a series of keys for controlling the operation of said mechanism, means under control of the keys for preventing the movement of the rack until after a key is depressed, and means under control of the rack for preventing the subsequent operation of a key until after the rack has been returned to normal position.

20. In an apparatus of the character described, the combination with a casing, of a series of movable devices for holding sales slips mounted in said casing, a total adding mechanism, a series of keys for controlling the operations of said mechanism, connections between the said devices and the said mechanism for operating the latter as said devices are moved, means for holding the depressed keys in their operated positions, and means for releasing the keys as the said devices are returning to their normal positions.

21. In an apparatus of the character described, the combination with a casing, of a series of leaves for holding sales slips pivoted to said casing, a total adding mechanism, a series of keys for controlling the operations of said mechanism, connections between the leaves and the said mechanism for operating the latter, means for holding the depressed keys in their operated positions, and means for releasing the keys as the leaves are returning to their normal positions.

22. In an apparatus of the character described, the combination with a casing, of a series of movable devices for holding account slips mounted in the casing, a total adder, a rack operated by the said devices and connected with the total adder for operating the same, a series of keys for controlling the operations of the adder, means for locking the keys in their operated positions, and means under control of the rack for releasing the keys as the rack returns to its normal position.

23. In an apparatus of the character described, the combination with a casing, of a series of leaves for holding account slips pivoted to the casing, a total adder, a rack operated by the said leaves and connected with the total adder for operating the same, a series of keys for controlling the operations of the adder, means for locking the keys in their operated positions, and means under control of the rack for releasing the keys as the rack returns to its normal position.

24. In an apparatus of the character described, the combination with a series of adding wheels, of a series of pivoted devices, normally arranged back to back, for holding account slips, means for pivotally supporting said devices and permitting them to swing relatively to each other, transfer mechanism for said adding wheels, and means under control of the said devices for turning the adding wheels as the said devices are moved in one direction and for operating the transfer mechanism when said devices are moved in the opposite direction.

25. In an apparatus of the character described, the combination with a series of adding wheels, of a series of pivoted leaves for holding account slips, transfer mechanism for the adding wheels, and means under control of the said leaves for turning the adding wheels as the said leaves are moved in one direction and for operating the transfer mechanism when said leaves are moved in the opposite direction.

26. In an apparatus of the character described, the combination, with a series of adding wheels, of a series of pivoted leaves for holding account slips, keys for controlling the action of the adding wheels, transfer mechanism for the adding wheels, and means operating by said leaves for turning the adding wheels distances determined by the operated keys as the leaves are moved in one direction and for operating the transfer mechanism when the leaves are moved in the opposite direction.

27. In an apparatus of the character described, the combination with a total adder, of a series of movable devices for holding account slips, a frame operated by said devices, connections between the frame and the total adder for operating the latter as the leaves are moved, a series of keys for controlling the movements of the adder, means for locking said keys in their depressed positions, and means operated by the frame for releasing the keys as the said devices are returned to their normal positions.

28. In an apparatus of the character described, the combination with a total adder, of a series of pivoted leaves for holding account slips, a rack frame operated by said leaves, connections between the rack frame and the total adder for operating the latter as the leaves are moved, a series of keys for controlling the movements of the adder, means for locking said keys in their depressed positions, and means operated by the rack frame for releasing the keys as the leaves are returned to their normal positions.

29. In an apparatus of the character described, the combination with a casing, of a series of account holding devices, means for pivotally supporting said devices in the casing and permitting them to swing relatively to each other, of a series of adding wheels, a series of differentially movable members, there being an adding wheel connected with each of said members, means for moving said members and their respective adding wheels when the account holding devices are operated, a series of keys for controlling the movements of said members, and transfer mechanism connected with the adding wheels.

30. In an apparatus of the character described, the combination with a casing, of a series of account holding devices mounted for movement within the casing, of a series of adding wheels, a series of rotatable drums, there being an adding wheel connected with each drum, means for turning said drums and their respective adding wheels when the account holding devices are operated, a series of keys for controlling the movements of said drums, and transfer mechanism connected with the adding wheels.

31. In an apparatus of the character described, the combination with a casing, of a series of account holding devices mounted for movement in the casing, a rotatable shaft, means connected with the account holding devices for rotating said shaft when said devices are moved, a series of rotatable drums, sets of gearing connecting said shaft with the said drums, whereby the latter are turned, a series of keys for determining the extent of movement of each of said drums, and an adding wheel connected with each of the drums, said adding wheels being turned with their drums when the latter are moved in one direction.

32. In an apparatus of the character described, the combination with a casing, of a series of account holding leaves pivoted in the casing, a rotatable shaft, means connected with the said leaves for rotating said shaft when the leaves are moved, a series of rotatable drums, sets of gearing connecting said shaft with the said drums, whereby the latter are turned, a series of keys for determining the extent of movement of each of said drums, and an adding wheel connected with each of the drums, said adding wheels being turned with their drums when the latter are moved in one direction.

33. In an apparatus of the character described, the combination with a casing, of a series of account-holding devices mounted in said casing, a rotatable shaft, means connecting the said devices with said shaft for rotating the latter back and forth as the devices are moved back and forth, a plurality of gears on said shaft, a second shaft parallel with the first shaft, a plurality of gears on the second shaft meshing respectively with the gears on the first shaft, a plurality of differentially movable members, there being one of said members for each of the gears on said second shaft, flexible connections between each drum and its respective member, the construction being such that as the first shaft is rotated the gears on the second shaft will also be rotated, means for normally holding the members from movement, a series of keys for each member, the keys in each series being adapted to engage with their respective member and control the extent of its movement, means connected with each of the series of keys for releasing the respective member when a key is depressed, and an adding wheel connected with each of said members.

34. In an apparatus of the character described, the combination with a casing, of a series of account-holding leaves pivoted to said casing, a rotatable shaft, means connecting the leaves with said shaft for rotating the latter back and forth as the leaves are opened and closed, a plurality of gears on said shaft, a second shaft parallel with the first shaft, a plurality of gears on the second shaft meshing respectively with the gears on the first shaft, a plurality of drums mounted concentrically with the second shaft, there being a drum for each of the gears on said second shaft, flexible connections between each drum and its respective gear, the construction being such that as the first shaft is rotated the gears on the second shaft will also be rotated, means for normally holding the drums from rotation, a series of keys for each drum, the keys in each series being adapted to engage with their respective drum and control the extent of its movement, means connected with each the series of keys for releasing the respective drum when a key is depressed, and an adding wheel connected with each of said drums.

35. In an apparatus of the character described, the combination with a casing, of a series of movable account holding devices in the casing, a gear segment that is oscillated as the devices are moved back and forth, a rack that is driven from said gear segment, a shaft that is turned in opposite directions as the rack is moved back and forth with the movement of the devices, a series of adding wheels, means for controlling the extent of movement of the adding wheels, and connections between the said shaft and the adding wheels for moving the latter upon the operation of the said devices.

36. In an apparatus of the character described, the combination with a casing, of a series of account holding leaves pivoted to the casing, a gear segment that is oscillated as the leaves are opened and closed, a rack that is driven from said gear segment, a shaft that is turned in opposite directions as the rack is moved back and forth with the movement of the leaves, a series of adding wheels, means for controlling the extent of movement of the adding wheels, and connections between the said shaft and the adding wheels for moving the latter upon the operation of the leaves.

37. In an apparatus of the character described, the combination with a casing, of a series of account holding devices movable in the casing, a gear segment that is oscillated about its center as the devices are moved back and forth, a total adding device, connections between said segment and said adding device for operating the latter, and mechanism for compelling a full stroke of the said segment in each of its directions.

38. In an apparatus of the character described, the combination with a casing, of a series of account holding leaves pivoted upon the casing, a gear segment that is oscillated about its center as the leaves are opened and closed, a total adding device, connections between said segment and said adding device for operating the latter, and mechanism for compelling a full stroke of the said segment in each of its directions.

39. In an apparatus of the character described, the combination with a casing, of a series of pivoted account holding leaves mounted on the casing, a gear segment that is pivoted to swing with the front leaf of the series, means for compelling a complete swinging movement of the said segment and leaf, a total adding device, connections between the said segment and the total adding device for operating the latter, keys for controlling the operations of the adding device, means for normally locking the segment against operation, and mechanism controlled by the keys for releasing said segment.

40. In an apparatus of the character described, the combination with a casing, of a series of pivoted account holding leaves mounted on the casing, a gear segment that is pivoted to swing with the front leaf of the series, means for compelling a complete swinging movement of the said segment and leaf, a total adding device, connections between the said segment and the total adding device for operating the latter, keys for controlling the operations of the adding device, means for holding the keys in their depressed positions, means for normally locking the segment against operation, mechanism controlled by the keys for releasing said segment, and means operated by said connections for releasing the depressed keys.

41. In an apparatus of the character described, the combination with a casing, of a series of pivoted account holding leaves mounted on the casing, a cam lever pivoted in the casing, means connected with the front leaf of the said series for moving the cam lever about its pivot, a total adder, and connections between the cam lever and the adder for operating the latter.

42. In an apparatus of the character described, the combination with a casing, of a series of pivoted account holding leaves mounted on the casing, a cam lever pivoted in the casing, means connected with the front leaf of the said series for moving the cam lever about its pivot, a rack connected with the cam lever, and a total adding device operated from the said rack.

43. In an apparatus of the character described, the combination with a casing, of a series of account holding leaves pivoted on the casing, a gear segment connected with the front leaf of the said series, a gear meshing with said gear segment, a pin secured to the said gear so as to move in an orbit as the gear rotates, a lever pivoted in the casing, said lever having a cam slot into which the said pin projects whereby the rotation of the gear causes the lever to oscillate, a total adder, and connections between the said lever and the adder for operating the latter.

44. In an apparatus of the character described, the combination with a casing, of a series of account holding leaves pivoted on the casing, a gear segment connected with the front leaf of the said series, a gear meshing with said gear segment, a pin secured to the said gear so as to move in an orbit as the gear rotates, a lever pivoted in the casing, said lever having a cam slot into which the said pin projects, whereby the rotation of the gear causes the lever to oscillate, a bar connected with the free end of the lever, and adding mechanism operated from said bar.

45. In an apparatus of the character described, the combination with a casing, of a series of account holding leaves pivoted on the casing, of a gear segment pivoted in the casing in axial alinement with the front leaf of the series, connections between said front leaf and the segment, means for compelling a complete movement of the segment in each of its directions, a gear meshing with the gear segment, said gear having a pin projecting therefrom so as to move in an orbit as the gear rotates, a lever pivoted at one end in the casing, said lever having a cam slot into which the said pin projects, a total adder, and connections between the said lever and the adder for operating the latter.

46. In an apparatus of the character described, the combination with a casing, of a series of account holding leaves pivoted on the casing, of a gear segment pivoted in the casing in axial alinement with the front leaf of the series, connections between said front leaf and the segment, means for compelling a complete movement of the segment in each of its directions, a gear meshing with the gear segment, said gear having a pin projecting therefrom so as to move in an orbit as the gear rotates, a lever pivoted at one end in the casing, said lever having a cam slot into which the said pin projects, a rack bar connected with the free end of said lever, and an adding device operated from said rack bar.

47. In an apparatus of the character described, the combination with a casing, of a series of account holding leaves pivoted in the casing, a gear segment mounted coaxially with the pivot of the front leaf of the series, connections between said front leaf and the gear segment for swinging the latter as the leaf is opened and closed, means for compelling a full stroke of the said gear segment in each of its directions, a gear meshing with the segment, a pin mounted on the gear, a lever pivoted to the casing above the said gear, said lever having a curved cam slot therein into which the said pin extends, the slot being so shaped that the lever will be moved from the front leaf of the series when the latter is near its closed position and will remain stationary while the leaf is moving except when it is near its closed position, an adding mechanism, and connections between the said lever and the adding mechanism for operating the latter.

48. In an apparatus of the character described, the combination with a casing, of a series of account holding leaves pivoted in the casing, a gear segment mounted coaxially with the pivot of the front leaf of the series, connections between said front leaf and the gear segment for swinging the latter as the leaf is opened and closed, a gear meshing with the segment, a pin mounted on the gear, a lever pivoted to the casing above the said gear, said lever having a curved cam slot therein into which the said pin extends, the slot being so shaped that the lever will be moved from the front leaf of the series when the latter is near its closed position and will remain stationary while the leaf is moving except when it is near its closed position, a rack bar connected with the free end of said lever, and an adding mechanism operated from the said rack bar.

49. In an apparatus of the character described, the combination with a casing, of a series of account holding devices mounted in the casing, a gear segment pivoted in the casing, a total adder, means connecting said segment with the adder for operating the latter as the segment is moved back and forth about its pivot, and means for connecting said segment to one of the account holding devices so as to operate the total adder from the said device.

50. In an apparatus of the character described, the combination with a casing, of a series of account-holding leaves pivoted in the casing, a gear segment pivoted coaxially with the front leaf of said series, an adding device, means connecting said segment with the adding device for operating the latter as the segment is moved back and forth about its pivot, and means for clamping said segment to the front leaf of the series so as to operate the adding device from the said front leaf.

51. In an apparatus of the character described, the combination with a casing, of a series of account holding leaves pivoted in the casing, a gear segment pivoted at each end to the casing and coaxially with the front leaf of the series, an adding mechanism, connections between said segments and the adding mechanism for operating the latter from the segments, and a clamping device connected with each segment and adapted to grasp the opposite edges of the front leaf whereby, as said leaf is opened and closed, the adding mechanism will be operated.

52. In an apparatus of the character described, the combination with a casing, of a series of account holding leaves pivoted in the casing, a gear segment pivoted at each end to the casing and coaxially with the front leaf of the series, an adding mechanism, keys for controlling the action of the adding mechanism, connection between said segments and the adding mechanism for operating the latter from the segments, a clamping device connected with each segment and adapted to grasp the opposite edges of the front leaf whereby, as said leaf is opened and closed, the adding mechanism will be operated, and means for preventing the operation of the segments until a key has been depressed.

53. In an apparatus of the character described, the combination with a casing, of a series of account holding leaves pivoted in the casing, a gear segment pivoted at each end of the casing in line with the pivot on the front leaf of the series, an adding device, connections between the gear segments and the adding device for operating the latter as the segments are oscillated, an arm extending upwardly from each segment alongside the ends of the front leaf, and a clamping member connected with each of said arms for engaging with the adjacent end of the front leaf whereby the said arms and segments are swung with the said leaf.

54. In an apparatus of the character described, the combination with a casing, of a series of account holding leaves pivoted in the casing, a gear segment pivoted at each end of the casing in line with the pivot on the front leaf of the series, an adding device, keys for controlling the action of the adding device, connections between the gear segments and the adding device for operating the latter as the segments are oscillated, an arm extending upwardly from each segment alongside the ends of the front leaf, a clamping member connected with each of said arms for engaging with the adjacent end of the front leaf, whereby the said arms and segments are swung with the said leaf, and means for preventing the operation of the segments until a key has been depressed.

55. In an apparatus of the character described, the combination with a casing, of a series of account holding leaves pivoted in the casing, a gear segment pivoted at each side of the casing, an adding device, connections between the gear segments and the adding device, an arm extending upwardly from each of said segments adjacent the ends of the front leaf, said arms having L-shaped cam slots therein, a channeled clamping member carried by each of said arms and having pins projecting into the cam slots, said members being adapted to receive the ends of the front leaf within the said channels, and means on said members for moving the latter in the cam slots whereby the members may be caused to clamp or disengage the front leaf, for the purpose specified.

56. In an apparatus of the character described, the combination with a casing, of a series of account holding leaves pivoted in the casing, a gear segment pivoted at each side of the casing, an adding device, connections between the gear segments and the adding device, an arm extending upwardly from each of said segments adjacent the ends of the front leaf, said arms having L-shaped cam slots therein, a channeled clamping member carried by each of said arms and having pins projecting into the cam slots, said members being adapted to receive the ends of the front leaf, within the said channels, means on said members for moving the latter in the cam slots, whereby the members may be caused to clamp or disengage the front leaf, for the purpose specified, keys for controlling the actions of the adding device, and means for preventing the operation of the segments until after a key has been depressed.

57. In an apparatus of the character described, the combination with a casing, of a series of account holding leaves pivoted in the casing, a gear segment journaled at each end of the casing, a gear wheel journaled on each side of the casing and meshing respectively with the said segments, each of said gear wheels being provided with a pin, a pair of levers pivoted at each end of the casing above the respective gear wheels, each of said levers being provided with a cam slot into which the pin on the adjacent gear wheel projects, the pins on the gear wheels being so mounted as to turn in orbits as the gear wheels rotate and thus swing the said levers about their pivots, an adding mechanism, connections between the said levers and the adding mechanism for operating the latter, a shaft, and pinions on the shaft meshing with the said gear wheels for causing the latter to move together.

58. In an apparatus of the character described, the combination with a casing, of a series of account holding leaves pivoted in the casing, a gear segment journaled at each end of the casing substantially in line with the pivot of the front leaf of the series, means for compelling a complete stroke of the segments in each direction, a gear wheel journaled on each side of the casing and meshing respectively with the said segments, each of said gear wheels being provided with a pin, a pair of levers pivoted at each end of the casing above the respective gear wheels, each of said levers being provided with a cam slot into which the pin on the adjacent gear wheel projects, the pins on the gear wheels being so mounted as to turn in orbits as the gear wheels rotate and thus swing the said levers about their pivots, an adding mechanism, keys for controlling the action of the adding mechanism, connections between the said levers and the adding mechanism for operating the latter, a shaft, pinions on the shaft meshing with the said gear wheels for causing the latter to move together, and means for preventing the rotation of the gear wheels until a key has been operated.

59. In an apparatus of the character described, the combination with a casing, of a series of account holding leaves pivoted on the casing, a register operating member movable with the said leaves, a series of groups of setting elements, a series of differentially movable members each controlled by its respective group of setting elements, means for operating the differentially movable members from the operating member, and an adding wheel connected with each of the said differentially movable members.

60. In an apparatus of the character described, the combination with a casing, of a series of account holding leaves pivoted on the casing, a register operating member movable with the said leaves, a series of groups of setting elements, a series of differentially movable members each controlled by its respective group of setting elements, means for operating the differentially movable members from the operating member, an adding wheel connected with each of the said differentially movable members, and means for preventing the movement of the operating member until one of the setting elements has been operated.

61. In an apparatus of the character described, the combination with a casing, of a series of account holding leaves pivoted in the casing, a register operating member connected with said leaves and operated thereby, a shaft, means for rotating said shaft from the register-operating member, a plurality of gears on the second shaft, each gear meshing with the corresponding gear upon the first shaft, differentially movable elements mounted upon the second shaft, there being one of said elements for each of the said gears on the second shaft, a spring connecting each element with its respective gear, said spring being normally under tension so as to cause the element to turn with its gear, a series of keys for each element for determining the extent of movement of the latter under the impulse of its spring, and an adding wheel connected with each of said elements.

62. In an apparatus of the character described, the combination with a casing, of a series of account holding leaves pivoted in the casing, a register operating member connected with said leaves and operated thereby, a shaft, means for rotating said shaft from the register operating member, a plurality of gears secured to said shaft, a second shaft, a plurality of gears on the second shaft, each gear meshing with the corresponding gear upon the first shaft, differentially movable elements mounted upon the second shaft, there being one of said elements for each of the said gears on the second shaft, a spring connecting each element with its respective gear, said spring being normally under tension so as to cause the element to turn with its gear, a series of keys for each element for determining the extent of movement of the latter under the impulse of its spring, an adding wheel connected with each of said elements, and means for preventing the movement of the operating member until after a key has been operated.

63. In an apparatus of the character described, the combination with a casing, of a series of account holding leaves pivoted in said casing, a register operating device connected with the said leaves so as to be operated thereby, a series of differentially movable elements, means for operating said elements from the register operating device, a series of keys for each element for determining the extent of movement of the latter, a locking plate for each series of keys, means for normally locking the said leaves from movement, means operated by one of the locking plates for unlocking the said leaves when a key is depressed, and means operated by the register operating device for unlocking the said keys.

64. In an apparatus of the character described, the combination with a casing, of a series of account holding leaves pivoted in said casing, a register operating device connected with the said leaves so as to be operated thereby, a series of differentially movable elements, means for normally locking said elements from movement, means for operating said elements from the register operating device, a series of keys for each element for determining the extent of movement of the latter, a locking plate for each series of keys, said plates being adapted to unlock their respective elements, means for normally locking the said leaves from movement, means operated by one of the locking plates for unlocking the said leaves when a key is depressed, and means operated by the register operating device for unlocking the said keys.

65. In an apparatus of the character described, the combination with a casing, of a series of account holding leaves pivoted in said casing, mechanism for registering or adding amounts, devices for operating said mechanism, and means for securing said devices to the front leaf of the series, whereby the opening of the front leaf will result in the operation of the mechanism.

66. In an apparatus of the character described, the combination with a casing, of a series of account holding leaves pivoted in said casing, mechanism for registering or adding amounts, devices for operating said mechanism, and means for clamping said devices to the side edges of the front leaf of the series, whereby the opening of the front leaf will result in the operation of the mechanism.

67. In an apparatus of the character described, the combination with a casing, of a series of account holding leaves pivoted in said casing, a register, a segment pivoted coaxially with the front leaf of the series, said segment having an upwardly extending arm, gearing connecting the said segment with the register for operating the latter, and means carried by the said arm for engaging with the front leaf of the series whereby when the said front leaf is opened and closed the segment and the said gearing will be actuated.

68. In an apparatus of the character described, the combination with a casing, of a series of account holding leaves pivoted in said casing, a register, a segment pivoted at each side of the casing and coaxially with the front leaf of the series, said segments having upwardly extending arms, gearing connecting the said segments with the register for operating the latter, and clamping devices carried by the said arms for engaging with the side edges of the front leaf of the series whereby when the said front leaf is opened and closed the segments and the said gearing will be actuated.

69. In an apparatus of the character described, the combination with a casing, of a series of account holding leaves pivoted in said casing, a register, a segment pivoted at each side of the casing and coaxially with the front leaf of the series, gearing connecting the said segments with the register for operating the latter, a channeled arm projecting from each of the said segments, said arms each being provided with L-shaped slots, a channel plate carried by each of said channeled arms, and pins projecting from the said channel plates into the slots in the respective arms, the slots being so shaped that the channel plates will move toward each other and clamp the side edges of the front leaf of the series whereby, when said front leaf is opened and closed, the register will be actuated.

70. In an apparatus of the character described, the combination with a casing, of a series of account slip holders, a register, a series of keys for controlling said register, a frame for operating the register, means for moving said frame when one of the said holders is moved, detent plates for locking the keys in their operated positions, and means under control of the said frame for locking the detent plates when the frame is moved from normal position.

71. In an apparatus of the character described, the combination with a casing, of a series of pivoted slip holding leaves, a register, a series of keys for controlling said register, a frame for operating the register, means for moving said frame when one of the said leaves is moved, detent plates for locking the keys in their operated positions, and means under control of the said frame for locking the detent plates when the frame is moved from normal position.

72. In an apparatus of the character described, the combination with a casing, of a series of account holding leaves pivoted in said casing, a register, a frame, means connecting the frame with the front leaf of the series whereby the frame is moved back and forth as the leaf is opened and closed, a series of keys for controlling the operations of the register, means connecting the register and the frame for operating the former, detent plates for the said keys, and a yoke engaging with the said frame for locking the detent plates against operation when the frame is moved from normal position.

73. In an apparatus of the character described, the combination with a casing, of a series of slip holding leaves mounted for movement in said casing, a register, a slidable frame, connections between said frame and the front leaf of the series for operating the said frame when the leaf is opened and closed, a series of keys for controlling the operations of the register, detent plates for locking the keys in their depressed positions, and means on the frame for releasing the keys as said frame approaches its normal position during the operation of the register.

74. In an apparatus of the character described, the combination with a casing, of a series of slip holding leaves mounted for movement in said casing, a register, a movable frame, connections between said frame and the front leaf of the series for operating the said frame when the leaf is opened and closed, a series of keys for controlling the operations of the register, detent plates for locking the keys in their depressed positions, means on the frame for releasing the keys as said frame approaches its normal position during the operation of the register, and means for adjusting the frame to secure the release of the keys at the proper moment during the operation of the machine.

75. In an apparatus of the class described, the combination of a series of account slip holding devices, means for pivotally supporting said devices back to back and permitting them to swing relatively to each other, an accounting device, and interlocking mechanism between said account slip holding devices and said accounting device effecting coöperation of certain of the parts of said devices in the complete operation of the apparatus.

76. In an apparatus of the class described, the combination of a series of account slip holding devices, means for pivotally supporting said devices back to back and permitting them to swing relatively to each other, an accounting device including a series of value keys for controlling the operation of said accounting device, and interlocking mechanism between said account slip holding devices and said accounting device effecting coöperation of certain of the parts of said devices in the complete operation of the apparatus.

77. In an apparatus of the class described, the combination of a series of pivoted account slip holding devices, an accounting device, and interlocking mechanism between said devices coöperating with each of such devices to prevent the complete operation of one device without the operation of the other.

78. In an apparatus of the class described, the combination with a support of a series of pivoted account slip holding devices, mounted to permit connection and disconnection from said support at will of said series as an entirety, an accounting device and interlocking mechanism between said account slip holding devices and said accounting device effecting coöperation of certain of the parts of said devices in the complete operation of the apparatus.

79. The combination of a series of filing devices normally arranged back to back, means for pivotally supporting said devices permitting them to swing relatively to each other, a series of value keys adapted for connection with and control of a registering or adding mechanism, and means for normally locking the said devices against operation arranged to be operated by the operation of one of said keys.

80. The combination of a series of normally locked filing devices, means for pivotally supporting said devices and permitting them to swing relatively to each other, a series of value keys adapted for connection with and control of a registering or adding mechanism, and means under control of the said keys for permitting the operation of said filing devices.

81. In an apparatus of the character described, the combination of a series of frames normally arranged back to back and pivotally mounted to swing relative to each other, mechanism for registering or adding amounts, and interlocking means between said mechanism and said frames.

82. In an apparatus of the character described, the combination of a series of frames normally arranged back to back and pivotally mounted to swing relative to each other, mechanism for registering or adding amounts, and interlocking means between said mechanism and said frames for automatically controlling the operation of the latter.

83. The combination of a frame to hold papers and the like, means for pivotally supporting said frame permitting it to swing from a substantially vertical position to a substantially horizontal position and vice versa, a registering mechanism, connections between said frame and the registering mechanism for operating the latter, and means for normally preventing the operation of the frame under control of the said mechanism.

84. In an apparatus of the character described, the combination of a series of frames normally arranged back to back and pivotally mounted to swing relative to each other, mechanism for registering or adding amounts, interlocking means between said mechanism and said frames, and means for locking the registering or adding mechanism after the operation of one of said frames.

85. In an apparatus of the character described, the combination of a device for holding papers or slips, means for pivotally supporting said device and permitting it to swing from a substantially vertical position to a substantially horizontal position and vice versa, of a series of registering or adding wheels, including a series of keys for controlling the movement of said wheels, means, operated by said paper holding device, for rotating said wheels, and locking mechanism for locking the keys against operation after the paper holding device has been operated.

86. In an apparatus of the character described, the combination of a device for holding papers or slips, means for pivotally supporting said device and permitting it to swing from a substantially vertical position to a substantially horizontal position and vice versa, of a series of registering or adding wheels, including a series of keys for controlling the movement of said wheels, means, operated by said paper holding device, for rotating said wheels, locking mechanism for locking the keys against operation after the paper holding device has been operated, and means for preventing the operation of said device before the operation of any of the keys.

87. In an apparatus of the character described, the combination with a casing, of a series of devices for holding papers or slips, normally arranged back to back, means for pivotally supporting said devices and permitting them to swing relatively to each other, mechanism for registering or adding amounts including a series of keys, means for locking one end device of the series of devices against operation, and connections between said locking means and said keys for releasing the end device upon the operation of one of said keys.

88. In an apparatus of the character described, the combination with a casing, of a series of devices for holding papers or slips, normally arranged back to back, means for pivotally supporting said devices and permitting them to swing relatively to each other, mechanism for registering or adding amounts including a series of keys, means for locking one end device of the series of devices against operation, connections between said locking means and said keys for releasing the end device upon the operation of one of said keys, and means for preventing the operation of additional keys after the said end device has been operated.

89. In an apparatus of the character described, the combination of a series of paper or slip holding devices normally arranged back to back, means for pivotally supporting said devices to swing independently relative to each other, registering or adding mechanism, including keys for controlling the said mechanism, and connections between one end device of said series of devices and the said mechanism for operating the latter including differential mechanism interposed in said connections.

90. In an apparatus of the character described, the combination of a series of paper or slip holding devices normally arranged back to back, means for pivotally supporting said devices to swing independently relative to each other, registering or adding mechanism, including keys for controlling the said mechanism, connections between one end device of said series of devices and the said mechanism for operating the latter including differential mechanism interposed in said connections, and interlocking means between the keys and the device connected with the registering and adding mechanism.

91. In an apparatus of the class described, the combination with a casing, of a series of frames mounted to swing relative to each other, means for supporting the frames in the casing, and permitting them to be detached therefrom, a registering or adding mechanism, a device connected with said mechanism, movably mounted on said casing, and detachable connections between said device and one of the frames coöperating with the leaf supporting means to permit the frames to be removed from the casing.

92. In an apparatus of the class described, the combination of a series of frames normally arranged back to back, means for pivotally supporting said frames permitting them to swing relative to each other, a registering or adding mechanism including a series of keys for controlling said mechanism, means for automatically locking a key after operation, and permitting only one key to be locked at a time, whereby if two keys are successively operated the first key is released.

93. In an apparatus of the class described, the combination of a series of pivoted paper holding frames, normally arranged back to back and free to swing independently relatively to each other, registering or adding mechanisms, a series of keys for each of said mechanisms for controlling their movement, an independent locking device for each series of keys for locking a key after it has been operated, the said locking device operating, in case one or more additional keys are operated, to release each prior operated key, whereby only one key in a series is locked for each operation of the registering or adding mechanisms, and means connected with said frames for operating the registering or adding mechanisms.

94. In an apparatus of the class described, the combination of a series of pivoted paper holding frames, a registering or adding mechanism, series of keys for controlling the movement of said mechanism, an independent locking device for each series of keys for locking a key after it has been operated, the said locking device operating, in case one or more additional keys are operated, to release each prior operated key, whereby only one key in a series is locked for each operation of the registering or adding mechanism, connections between the paper holding frames and said mechanism for operating the latter, and means for preventing the operation of any of the keys after the registering and adding mechanism has been operated.

95. In an apparatus of the class described, the combination of a series of pivoted paper holding frames, registering or adding mechanism, series of keys for controlling the movement of said mechanism, an independent locking device for each series of keys for locking a key after it has been operated, the said locking device operating, in case one or more additional keys are operated, to release each prior operated key, whereby only one key in a series is locked for each operation of the registering or adding mechanism, connections between the paper holding frames and said mechanism for operating the latter, and means for releasing the operated key of each group after the operation of the registering or adding mechanisms.

96. In a filing and accounting mechanism, the combination of a series of adding or registering wheels, including transfer mechanism therefor, a movable device for carrying papers, means for pivotally supporting said device permitting it to swing from a substantially vertical position to a substantially horizontal position and vice versa, and the like, and means operated by said device for controlling said registering wheels and said transfer mechanism.

97. In a filing and accounting mechanism, the combination of a series of adding or registering wheels, including transfer mechanism therefor, a movable device for carrying papers and the like, means for pivotally supporting said device permitting it to swing from a substantially vertical position to a substantially horizontal position and vice versa, and means operated by said device for alternately controlling said registering wheels and said transfer mechanism.

98. In a filing and accounting mechanism, the combination of a series of adding or registering wheels, including transfer mechanism therefor, means for setting said transfer mechanism controlled by the registering wheels, a movable device for carrying papers and the like, means for pivotally supporting said device permitting it to swing from a substantially vertical position to a substantially horizontal position and vice versa, and means operated by said device for operating the registering wheels and the transfer mechanism.

99. In a filing and registering or adding apparatus, the combination of a series of adding or registering wheels, keys for controlling the operation of said wheels, a series of movable leaves, normally arranged back to back, means for pivotally supporting said leaves and permitting them to swing independently relative to each other, and mechanism between one of said leaves and said wheels for operating the latter under the control of said keys.

100. In a filing and registering or adding apparatus, the combination of a series of adding or registering wheels, keys for controlling the operation of said wheels, a series of movable leaves, mechanism between one of said leaves and said wheels for operating the latter under the control of said keys, and interlocking means for controlling the operation of the leaves.

101. In an apparatus of the character described, the combination with a total adder, of a series of movable devices for holding account slips, a frame operated by said devices, connections between the frame and the total adder for operating the latter as the leaves are moved, a series of keys for controlling the movements of the adder, means for locking said keys in their depressed positions, and means for releasing the keys as the said devices are returned to their normal positions.

102. In an apparatus of the character described, the combination with a casing, of a series of account holding devices, means for pivotally supporting said devices within the casing and permitting them to move therein and relatively to each other, a series of adding wheels, a series of differentially movable members, there being an adding wheel connected with each of said members, means for moving said members and their respective adding wheels when the account holding devices are operated, and a series of keys for controlling the movements of said members.

103. In an apparatus of the character described, the combination with a casing, of a series of account holding devices normally arranged back to back, means for pivotally supporting said devices permitting them to swing independently relatively to each other, a series of adding wheels, a series of rotatable drums, there being an adding wheel connected with each drum, means for turning said drums and their respective adding wheels when the account holding devices are operated, and a series of keys for controlling the movements of said drums.

104. In an apparatus of the character described, the combination of a shaft, a series of adding or registering wheels rotatably mounted on said shaft, a series of paper or slip holding devices, means for pivotally supporting said devices and permitting them to swing relatively to each other, connections between one of said devices and said shaft for rotating the latter when the said device is operated, separate mechanism connected with the shaft for operating each of said wheels and means for controlling the movements of said mechanisms.

105. In an apparatus of the character described, the combination of a shaft, a series of adding or registering wheels rotatably mounted on said shaft, a series of paper or slip holding devices, normally arranged back to back, means for pivotally supporting said devices and permitting them to swing relatively to each other, connections between one of said devices and said shaft for rotating the latter when the said device is operated, separate mechanism connected with the shaft for operating each of said wheels, means for controlling the movements of said mechanisms, and interlocking mechanism between the controlling means and the device which is connected with the said shaft for locking the said device against operation.

106. In an apparatus of the character described, the combination with a casing, a movable paper holding device mounted in the casing, means for pivotally supporting said device and permitting it to swing from a substantially vertical position to a substantially horizontal position and vice versa, a registering or adding mechanism, connections between said paper holding device and the registering or adding mechanism for operating the latter, and mechanism which prevents rearward movement of said paper holding device, until it has completed its movement in one direction.

107. In an apparatus of the character described, the combination with a casing, a movable paper holding device, means for pivotally supporting said device in the casing and permitting it to swing from a substantially vertical position to a substantially horizontal position, and vice versa, a registering or adding mechanism, connections between said paper holding device and the registering or adding mechanism for operating the latter, mechanism which prevents rearward movement of said paper holding device until it has completed its movement in one direction, and interlocking mechanism between said device and the registering or adding mechanism.

108. In an apparatus of the character described, the combination with a casing, of a series of account holding leaves pivoted on the casing, a gear segment pivoted in the casing in axial alinement with the front leaf of the series, connections between said front leaf and the segment, a gear meshing with the gear segment, said gear having a pin projecting therefrom so as to move in an orbit as the gear rotates, a lever pivoted at one end in the casing, said lever having a cam slot into which the said pin projects, a total adder, and connections between the said lever and the adder for operating the latter.

109. In an apparatus of the character described, the combination with a casing, of a series of account holding leaves pivoted in the casing, a gear segment mounted coaxially with the pivot of the front leaf of the series, connections between said front leaf and the gear segment for swinging the latter as the leaf is opened and closed, a gear meshing with the segment, a pin mounted on the gear, a lever pivoted to the casing above the said gear, said lever having a curved cam slot therein into which the said pin extends, the slot being so shaped that the lever will be moved from the front leaf of the series when the latter is near its closed position and will remain stationary while the leaf is moving except when it is near its closed position, an adding mechanism, and connections between the said lever and the adding mechanism for operating the latter.

110. In an apparatus of the character described, the combination with a casing, of a series of account holding devices normally arranged side by side, means for pivotally supporting said leaves on axes parallel to each other and permitting them to swing relatively to each other, a gear segment pivoted in the casing, a total adder, means connecting said segment with the adder for operating the latter as the segment is moved back and forth about its pivot, means for connecting said segment to one of the account holding devices so as to operate the total adder from the said device, and interlocking means for controlling the operation of the gear segment and the holding device connected thereto.

111. In an apparatus of the character described, the combination with a casing, of a series of account holding leaves pivoted in the casing, a gear segment pivoted at each end to the casing and coaxially with the front leaf of the series, an adding mechanism, connections between said segments and the adding mechanism for operating the latter from the segments, a clamping device connected with each segment and adapted to grasp the opposite edges of the front leaf whereby, as said leaf is opened and closed, the adding mechanism will be operated, and means for controlling the operation of the segment and the front leaf.

112. In an apparatus of the character described, the combination with a casing, of a series of account holding leaves pivoted in the casing, a gear segment journaled at each end of the casing, a gear wheel journaled on each side of the casing and meshing respectively with the said segments, each of said gear wheels being provided with a pin, a pair of levers pivoted at each end of the casing above the respective gear wheels, each of said levers being provided with a cam slot into which the pin on the adjacent gear wheel projects, the pins on the gear wheels being so mounted as to turn in orbits as the gear wheels rotate and thus swing the said levers about their pivots, an adding mechanism, connections between the said levers and the adding mechanism for operating the latter, a shaft, and pinions on the shaft meshing with the said gear wheels for causing the latter to move together.

113. In an apparatus of the character described, the combination with a casing, of a series of account holding leaves pivoted in the casing, a gear segment journaled at each end of the casing, a gear wheel journaled on each side of the casing and meshing respectively with the said segments, each of said gear wheels being provided with a pin, a pair of levers pivoted at each end of the casing above the respective gear wheels, each of said levers being provided with a cam slot into which the pin on the adjacent gear wheel projects, the pins on the gear wheels being so mounted as to turn in orbits as the gear wheels rotate and thus swing the said levers about their pivots, an adding mechanism, connections between the said levers and the adding mechanism for operating the latter, a shaft, pinions on the shaft meshing with the said gear wheels for causing the latter to move together, and means for preventing the rotation of the gear wheels until a key has been operated.

114. In an apparatus of the character described, the combination with a casing, of a series of account holding leaves pivoted on the casing, a register operating member movable with the said leaves, a series of groups of setting elements, a series of differentially movable members from the operating member, an adding wheel connected with each of the said differentially movable members, means locking said operating member, and connections between one of said setting elements and said locking means for releasing the latter when the setting element is operated.

115. In an apparatus of the character described, the combination of mechanism for adding amounts to register the total thereof, a series of bill holding leaves normally arranged side by side, means for pivotally supporting said leaves along one edge and permitting them to swing relatively to each other separately or in groups, and means for operating the adding mechanism from that end leaf of said series of leaves which is exposed to the operator when said leaves are in normal position.

In testimony whereof, we hereunto affix our signatures in the presence of two witnesses.

PERRY A. McCASKEY.
SAMUEL E. FOUTS.

Witnesses:
W. L. McGarrell,
Brennan B. West.